United States Patent [19]

Tokita et al.

[11] Patent Number: 5,430,696
[45] Date of Patent: Jul. 4, 1995

[54] MAGNETO-OPTICAL RECORDING MEDIUM

[75] Inventors: Toshiaki Tokita, Zama; Motoharu Tanaka, Mishima; Atsuyuki Watada, Kawasaki, all of Japan

[73] Assignee: Ricoh Company, Ltd., Tokyo, Japan

[21] Appl. No.: 235,116

[22] Filed: Apr. 28, 1994

Related U.S. Application Data

[62] Division of Ser. No. 825,015, Jan. 24, 1992, Pat. No. 5,337,293.

Foreign Application Priority Data

Jan. 24, 1991 [JP] Japan .................... 3-24109

[51] Int. Cl.⁶ ........................................... G11B 13/04
[52] U.S. Cl. ................................. 369/13; 369/116; 360/59
[58] Field of Search ............... 369/13, 14, 275.2, 116; 360/59, 114; 365/122; 428/694 ML

[56] References Cited

U.S. PATENT DOCUMENTS

| | | | |
|---|---|---|---|
| 4,910,622 | 3/1990 | Saito et al. | 369/13 |
| 4,938,915 | 7/1990 | Saito | 369/13 |
| 5,164,925 | 11/1992 | Saito et al. | 369/13 |

*Primary Examiner*—Georgia Y. Epps
*Assistant Examiner*—Tan Dinh
*Attorney, Agent, or Firm*—Cooper & Dunham

[57] ABSTRACT

A magneto-optical recording method capable of overwriting on a magneto-optical recording medium is disclosed. The magneto-opticals recording medium includes a recording layer comprising a single magnetic layer with magnetic anisotropy and the magneto-optical recording methods includes the step of applying a laser beam with a light power level $P_1$ to the recording layer when a binary coded signal "1" is written therein under a fixed external magnetic field; and the steps of applying a laser beam with a light power level Poh to the recording layer and successively applying a laser beam with a light power level Pol to said recording layer when a binary coded signal "0" is written therein under a fixed external magnetic field, wherein Pol, $P_1$ and Poh are in the relationship of $O < Pol < P_1 < Poh$.

4 Claims, 3 Drawing Sheets

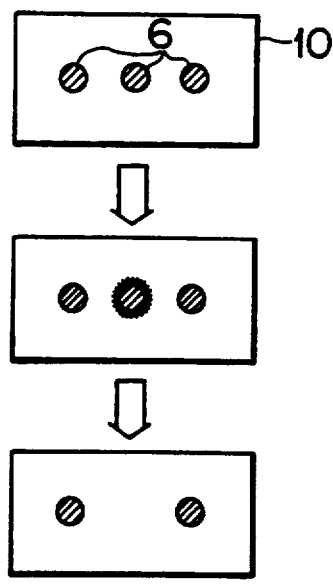
FIG. 1(a) PRIOR ART
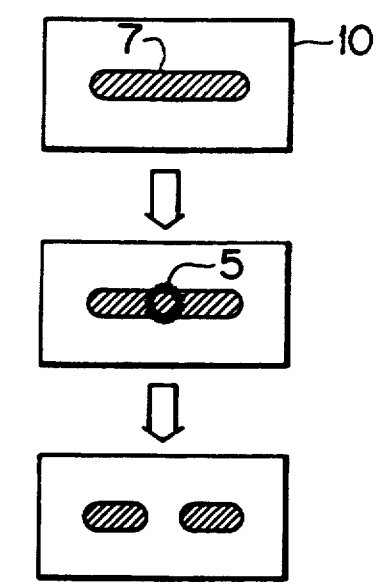
FIG. 1(b) PRIOR ART
FIG. 2(a)
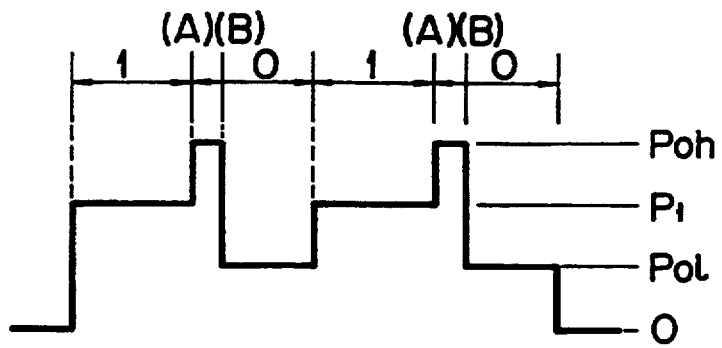
FIG. 2(b) PRIOR ART
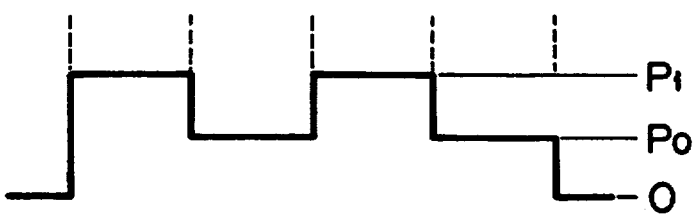

WHEN OW PRIOR SIGNAL IS "0".

WHEN OW PRIOR SIGNAL IS "1".

MAGNETO-OPTICAL RECORDING MEDIUM

This is a division of application Ser. No 825,015, filed Jan. 24, 1992, and now U.S. Pat. No. 5,332,293.

BACKGROUND OF THE INVENTION

1. Field of the Invention

The present invention relates to a magneto-optical recording method capable of performing overwriting, and the magneto-optical recording medium for use in the same.

2. Discussion of Background

Recently, magneto-optical recording media utilizing magneto-optical effects, which are used as rewritable optical recording media, have been actively studied and developed. Some of these are in fact used in practice. The magneto-optical recording media are capable of recording a large volume of information with high density, and noncontact reproducing of information, with easy access. Furthermore, the magneto-optical recording media are expected to be utilized for filing document information, as file memories for video images and still pictures, and memory devices for computers. There are still several technical problems which must be solved in order to improve the performance of the magneto-optical recording media to a level equal to or higher than that of magnetic disks. One of the most significant problems is in the overwrite technology. With current commercially available magneto-optical recording medium, when information is newly written, it is necessary to first erase an originally stored information, then write in the new information. A considerable amount of time is wasted in making this erasure. This shortcoming can be eliminated by overwrite technologies. The overwrite technologies which have been proposed can be roughly classified into a technology using magnetic-field modulation systems and a technology using a light modulation system, which includes a multi-beam system and a two-layer system.

In the magnetic-field modulation system, while keeping the light intensity constant, recording is performed by reversing the polarity of a magnetic field applied in accordance with the information to be recorded. In this system, the polarity of the magnetic field has to be reversed at high speed, so that a magnetic head of a floating type has to be employed, which makes it difficult to change the recording medium to be used therewith.

On the other hand, in the light modulation system, while keeping the intensity of the magnetic-field constant, recording is performed by enabling or disabling or turning ON or OFF the application of a laser beam or by subjecting the laser beam to an intensity modulation in accordance with the information to be recorded. The multi-beam system which belongs to the light modulation system is a pseudo-overwrite system in which the direction of the magnetic field applied is reversed for each rotation of a medium by using two or three laser beams, so that recording and erasure are conducted for each track of the medium. This system has the shortcoming that the apparatus for this system has a complicated structure and is expensive. The two-layer system is directed to the accomplishment of overwriting by use of a magneto-optical recording medium with a recording layer which is divided into two layers. This system is disclosed, for instance, in Japanese Laid-Open Patent Application 62-175948. In the two-layer system disclosed in this reference, a magneto-optical recording medium consisting of a recording layer consisting of TbFe and an auxiliary layer consisting of TbFeCo is employed. Overwriting is accomplished by initializing the recording medium and then applying thereto laser beams with different powers and an external magnetic field. More specifically, in this system, the magnetization of the auxiliary layer is oriented in one direction with application of a magnetic field for initialization of about 4 KOe prior to a recording step, the temperature T of the recording medium is raised above the Curie temperature $T_{C2}$ of the auxiliary layer, that is, $T > T_{C2}$, with application of a high power laser beam, a magnetic field for recording with a magnetization direction opposite to that of the magnetic field for the initialization is applied, thereby reversing the magnetization of the auxiliary layer, and the magnetization is transferred to the recording layer when the recording medium is cooled, whereby recording is accomplished. Furthermore, the recorded information can be erased by raising the temperature T of the recording medium to a temperature between $T_{C1}$ and $T_{C2}$, that is, $T_{C1} < T < T_{C2}$, where $T_{C1}$ is the Curie temperature of the recording layer, with application of a low power laser beam thereto and transferring the magnetization direction of the auxiliary layer to the recording layer. However, while this system has the merit that recording is performed at high speed, the problems arise that a high laser power is necessary for this system when writing and a large magnetic field must be applied for the initialization of the recording layer.

Several overwrite systems for magneto-optical recording such as the above-mentioned system have proposed. However, each system has its own strong points and weak points. It is said that many breakthroughs are necessary for developing those systems to such a level as to be usable in practice.

On the other hand, overwrite systems utilizing demagnetizing field have also been proposed, such as a system reported in Han-Ping D. Shieh & Mark H. Kryder; Appl. Phys. Lett. 49,473 (1986). This system is a kind of light modulation system. This system has a single-layer structure, and high capability of writing with application of a low power laser beam compared with the two-layer system, and no magnetic-field for initialization is necessary. However, in such an overwrite system utilizing demagnetizing field, the formation and the erasure of the magnetic domain are controlled by utilizing the differences in demagnetizing field energy, domain wall energy and Zeeman energy at a domain wall position, which are caused by the differences of the conditions for the application of a laser beam, so that the properties of the magnetic layer and the conditions for the application of a laser beam are dispersed. As a result, this system has the shortcoming that magnetic domains in which signal cannot be erased completely, and unnecessary magnetic domains are apt to be formed in the recording medium.

SUMMARY OF THE INVENTION

It is therefore a first object of the present invention to provide a magneto-optical recording method by which the problem of incomplete erasing of information from a single-layer magneto-optical recording medium can be eliminated and a signal to be overwritten newly (hereinafter referred to as the OW signal) can be formed stably without being affected by a previous written signal (hereinafter referred to as the OW prior signal).

A second object of the present invention is to provide a magneto-optical recording medium which is employed in the above magneto-optical recording method.

The first object of the present invention is achieved by a magneto-optical recording method capable of overwriting on a magneto-optical recording medium comprising a recording layer comprising a single magnetic layer with magnetic anisotropy comprising the step of applying a laser beam with a light power level $P_1$ to the recording layer when a binary coded signal "1" is written therein under a fixed external magnetic field; and the steps of applying a laser beam with a light power level Poh to the recording layer and successively applying a laser beam with a light power level Pol to the recording layer when a binary coded signal "0" is written therein under a fixed external magnetic field, wherein Pol, $P_1$ and Poh are in the relationship of $0 < Pol < P_1 < Poh$.

The second object of the present invention is achieved by a magneto-optical recording medium for use in the above-mentioned magneto-optical recording method capable of overwriting, with the difference between the compensation point and the Curie temperature of the above-mentioned magnetic layer being 150° C. or less.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 1(a) and 1(b) are diagrams in explanation of overwriting a signal "0" on a signal "1" in a magnetooptical recording medium by use of a conventional system;

FIG. 2(a) is a diagram showing the light power level during the overwriting process by a magneto-optical recording method of the present invention;

FIG. 2(b) is a diagram showing the light power level by a conventional magneto-optical recording method;

DETAILED DESCRIPTION OF THE PREFERRED EMBODIMENT

Figure 3A:
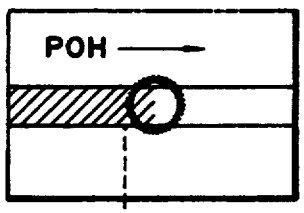
FIG. 3(a) is a diagram showing the relation between the laser beam and the magnetic domain on the magneto-optical recording medium at the moment a signal is overwritten on the magneto-optical recording medium by changing the writing of magnetization from "1" to "0", that is, at the moment of the initial application of the laser beam with a power level Poh, according to the present invention.
Figure 3A:
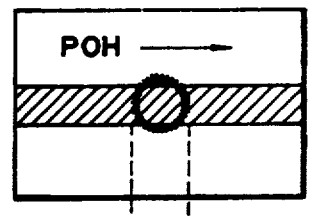

Before a specific explanation of the magneto-optical recording method of the present invention, the occurrence of an incomplete erased magnetic domain will be explained. Hereinafter, the light power levels for overwriting a signal "1" and a signal "0" will be respectively referred to as $P_1$ and $P_0$. For example, as described in "M. H. Kryder & M. D. Schultz: Japanese Journal of Applied Physics, 28 (1989) Supplement 28-3, pp. 3-9", this is a method of controlling the overwriting with two-coded power levels. These signal levels are shown in FIG. 2(b). According to the experiments by the inventors of the present invention, it was confirmed that it is very difficult to carry out both processes shown in (a) and (b) in the following four recording processes.

(a) A signal "0" is overwritten with a power level Pe on a signal "0".

(b) A signal "1" is overwritten with a power level Pw on a signal "0".

(c) A signal "0" is overwritten with a power level Pe on a signal "1".

(d) A signal "1" is overwritten with a power level Pw on a signal "1".

This is because there is a significantly large difference between a light power level to be required for overwriting between in the case (1) where an OW prior signal exists in the shape of a comparatively cylindrical magnetic domain 6 on a magneto-optical recording medium 10, and is erased with application of a laser beam 5, and then a signal "0" is overwritten thereon as shown in FIG. 1(a) and that in the case where (2) an OW prior signal exists as a magnetic domain in the shape of a stripe on the magneto-optical recording medium 10, is erased with application of a laser beam 5, and then a signal "0" is overwritten thereon as if the center of the magnetic domain 7 is chopped as shown in FIG. 1(b).

More specifically, it is difficult to chop the stripe-shaped magnetic domain in the case (2) with a power level Pol suitable for the case (1), so that the signal is erased incompletely. Furthermore, it is possible to erase the entire cylindrical magnetic domain with a power level Poh suitable for the case (2). However, when in the above-mentioned recording process (a), the process of overwriting a signal "0" on a signal "0", that is, of applying a laser beam to a portion where no magnetic domain exists in such a manner that no magnetic domains are formed, is unstable, so that the phenomenon that magnetic domains are eventually formed occurs.

The method of the present invention is characterized in that the light power level is modulated so as to reduce the incomplete erasure of signals and the formation of unnecessary magnetic domains as mentioned above, thereby attaining stable overwriting of signals.

The practical method and principle of the magneto-optical recording method of present invention will now be explained.

In the method of the present invention, a laser beam with a light power level $P_1$ is applied in the above-mentioned recording processes (b) and (d), and a laser pulse with a light power level Poh is applied and a laser beam with a power level Pol is successively applied in the recording processes (a) and (c). Each light power level for each recording process is shown in FIG. 2(a).

Figure 3B:
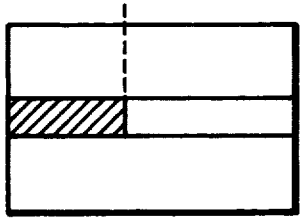
FIG. 3(b) is a diagram showing the relation between the laser beam and the magnetic domain on the magneto-optical recording medium at the moment of the completion of the application of the laser beam with a power level Poh according to the present invention.

Furthermore, the principle of overwriting by use of the method of the present invention will be explained. At the moment writing is changed from a signal "1" to a signal "0" as shown in a part (A) in FIG. 2(a), the relation between the moving direction as shown by the arrow of a laser beam and the magnetic domain on the magneto-optical recording medium is shown in FIG. 3(a). when a laser beam with a light power level Poh is applied in the state as shown in FIG. 3(a), the applied laser beam acts on the left side of the laser beam, that is, in the direction where the demagnetizing field formed by an OW signal forms no magnetic domains, so that no magnetic domains are formed in that position regardless of the state of the right side of the laser beam, that is, regardless of the state of an OW prior signal as shown in FIG. 3(b). After that, when the light power level of the laser beam is changed to Pol as shown in a part (B) in FIG. 2(a), the left side of the laser beam is in a state free from magnetic domains, so that even if a magnetic domain exists as an OW prior signal, the magnetic domain is erased, and when the magnetic domain is not present, the same state is maintained.

A magneto-optical recording medium employed in the magneto-optical recording method of the present invention will be explained.

Figure 4:
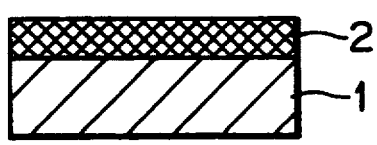
FIG. 4 is a schematic cross-sectional view of a basic magneto-optical recording medium according to the present invention.

FIG. 4 shows a schematic cross-sectional view of a magneto-optical recording medium of the present invention. The magneto-optical recording medium comprises a substrate 1 comprising a glass, a plastic or other materials, and a recording layer 2 comprising a magnetic layer with perpendicular anisotropy, that is, a perpendicularly magnetized film layer formed thereon, preferably, with a thickness of 20 to 150 nm.

The same magnetic film layers as in the recording layer of conventional magneto-optical recording media can be used in the recording layer 2. In particular, it is preferable that the rare earth - translation metal amorphous alloy such as TbDyFeCo or the like be used. In the recording layer employed in the present invention, it is preferable that the difference between the compensation point and the Curie temperature of the above-mentioned magnetic film layer be 150° C. or less, more preferably 120° C. or less, because if the difference of the temperature exceeds 150° C., a large demagnetizing field is generated in the direction advantageous for the formation of magnetic domains, that is, in the direction disadvantagous for the erasure of magnetic domains, so that it is difficult to erase the previously written magnetic domains and accordingly overwriting becomes difficult.

FIG. 4 shows the most basic layer structure of the magneto-optical recording medium employed in the present invention. However, the present invention is not limited to this structure as shown in FIG. 4. For example, a SiN layer, a ZnS layer or the like may be provided as an undercoat layer 3 between the substrate 1 and the recording layer 2, or as a protective layer 4 on the recording layer 2. Additionally, an organic resin layer or the like can be overlaid thereon.

Other features of this invention will become apparent in the course of the following description of exemplary embodiments, which are given for illustration of the invention and are not intended to be limiting thereof.

EXAMPLE 1

Figure 5:
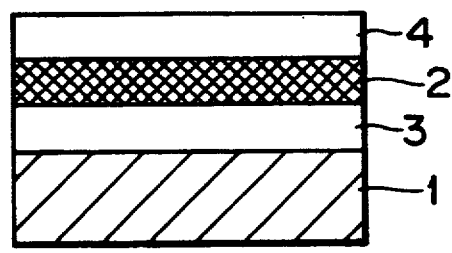
FIG. 5 is a schematic cross-sectional view of a representative magneto-optical recording medium according to the present invention.

A SiN layer 3 with a thickness of 60 nm was formed on a substrate 1 made of a glass by the sputtering process and a DyFeCo layer 2 with a thickness of 100 nm was directly overlaid thereon without being exposed to air by the sputtering. In a similar manner to the above, a Sin layer with a thickness of 60 nm was further overlaid thereon by the sputtering process, whereby a magneto-optical recording medium having a structure as shown in FIG. 5 was obtained. The intensity of magnetization at room temperature of the thus obtained recording medium was 165 emu/cc, the compensation point thereof was 160° C. and the Curie temperature was 210° C.

The difference between the Curie temperature and the compensation point was 50° C.

Figure 6:
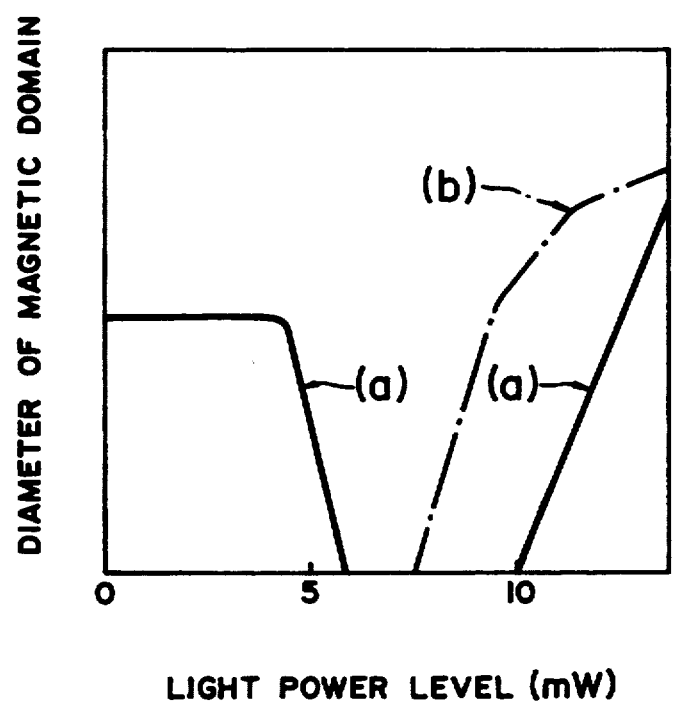
FIG. 6 is a diagram showing the relation between the light power level and the diameter of a magnetic domain obtained in Example 1 of a magneto-optical recording medium according to the present invention.

A cylindrical magnetic domain with a diameter of 0.8 $\mu$m was formed on the above magneto-optical recording medium. Laser beams were applied to the recording medium from right above the cylindrical magnetic domain, with the intensity of the light power changed at a pulse of 100 nsec, under application of an external magnetic field with an intensity of 50 Oe in the direction advantageous for overwriting, whereby the changes in the diameter of the magnetic domain were inspected. The results are shown by a curve (a) in FIG. 6.

The results indicate that the cylindrical magnetic domain is completely erased with application of a laser beam with an intensity of 6 to 10 mW. Furthermore, the above magneto-optical recording medium was magnetically saturated to produce a state free from magnetic domains. Laser beams were applied thereto in such a state, so that the relation between the intensity of the light power and the diameter of the magnetic domain was measured. The results are shown by a curve (b) in FIG. 6 was obtained. In addition, a stripe-shaped magnetic domain was formed on the above magneto-optical recording medium and a laser beam was applied to a portion near the center of the above magnetic domain under the same conditions as mentioned above. As a result, the stripe-shaped magnetic domain was cut in the middle with application of laser beams with a power in the range of 9 to 10 mW.

OW prior signals were written on the magneto-optical recording medium in the form of magnetic domains with a length of 5 $\mu$m and a cycle of 10 $\mu$m under the abovementioned conditions. With $P_1$, Poh and Pol respectively set 8.5 mW, 10 mW and 6 mW, OW signals were overwritten by laser beams with a laser pulse width of 100 nsec, and with the pulse application cycle on the magneto-optical medium set at 0.5 $\mu$m, under the conditions of 6 pulses for $P_1$, 1 pulse for Poh and 5 pulses for Pol, whereby OW signals in the form of magnetic domains with a length of about 3 $\mu\mu$and a cycle of 6 $\mu$m were obtained.

Examples 2 to 3 and Comparative Examples 1 to 2

The procedure for Example 1 was repeated except that the composition of the recording layer employed in Example 1 was changed as shown in TABLE-1, whereby four magneto-optical recording media were obtained. These magneto-optical recording media were tested in the same manner as in Example 1. The magneto-optical recording media obtained in Examples 2 and 3 yielded the same test results as in Example 1, while the magneto-optical recording media obtained in Comparative Examples 1 and 2 were found unsuitable for an overwriting system by subjecting a single-layer magneto-optical recording medium to light intensity modulation, because erasing magnetic domains was impossible in these recording media.

TABLE 1

| | Intensity of the magnetization at Room Temperature (emu/cc) | Compensation Point (°C.) | Curie Temperature (°C.) | Curie Temperature - Compensation Point | Over-writing |
|---|---|---|---|---|---|
| Ex. 2 | 130 | 100 | 220 | 115 | ○ |
| Ex. 3 | 130 | 130 | 170 | 70 | ○ |
| Com. Ex. 1 | 150 | Room Temperature or less | 230 | 230 or more | x |
| Com. Ex. 2 | 30 | 20 | 220 | 200 | x |

Symbol "○" denotes "possible", and symbol "x" denotes "impossible".

As explained in the foregoing, the magneto-optical recording method of the present invention is capable of minimizing the occurrence of the problems such as incomplete erasure of magnetic domains and formation of unnecessary magnetic domains, and is capable of forming signals (OW signals) to be newly overwritten without being affected by previously written signals (OW prior signals), so that stable and efficient overwriting can be carried out.

Furthermore, the magneto-optical recording medium of the present invention for use in the above magneto-optical recording method can be fabricated easily and attains stable overwriting.

What is claimed is:

1. A magneto-optical recording medium comprising a substrate and a recording layer formed thereon consisting of a single magnetic layer with magnetic anisotropy, with the difference between the compensation temperature and the Curie temperature of said single magnetic layer being less than or equal to 150° C. for use in a magneto-optical recording method capable of overwriting on said magneto-optical recording medium comprising the step of applying a laser beam with a light power level $P_1$ to said recording layer when a binary coded signal "1" is written therein under a fixed external magnetic field; and the steps of successively applying a laser beam with a light power level Poh and a laser beam with a light power level Pol to said recording layer when a binary coded signal "0" is written therein under a fixed external magnetic field, wherein Pol, $P_1$ and Poh are in the relationship of $O < Pol < P_1 < Poh$.

2. The magneto-optical recording medium as claimed in claim 1, wherein said recording layer has a thickness in the range of 20 to 150 nm.

3. The magneto-optical recording medium as claimed in claim 1, further comprising an undercoat layer between said substrate and said recording layer.

4. The magneto-optical recording medium as claimed in claim 1, further comprising a protective layer which is overlaid on said recording layer.

* * * * *